Figure 1:
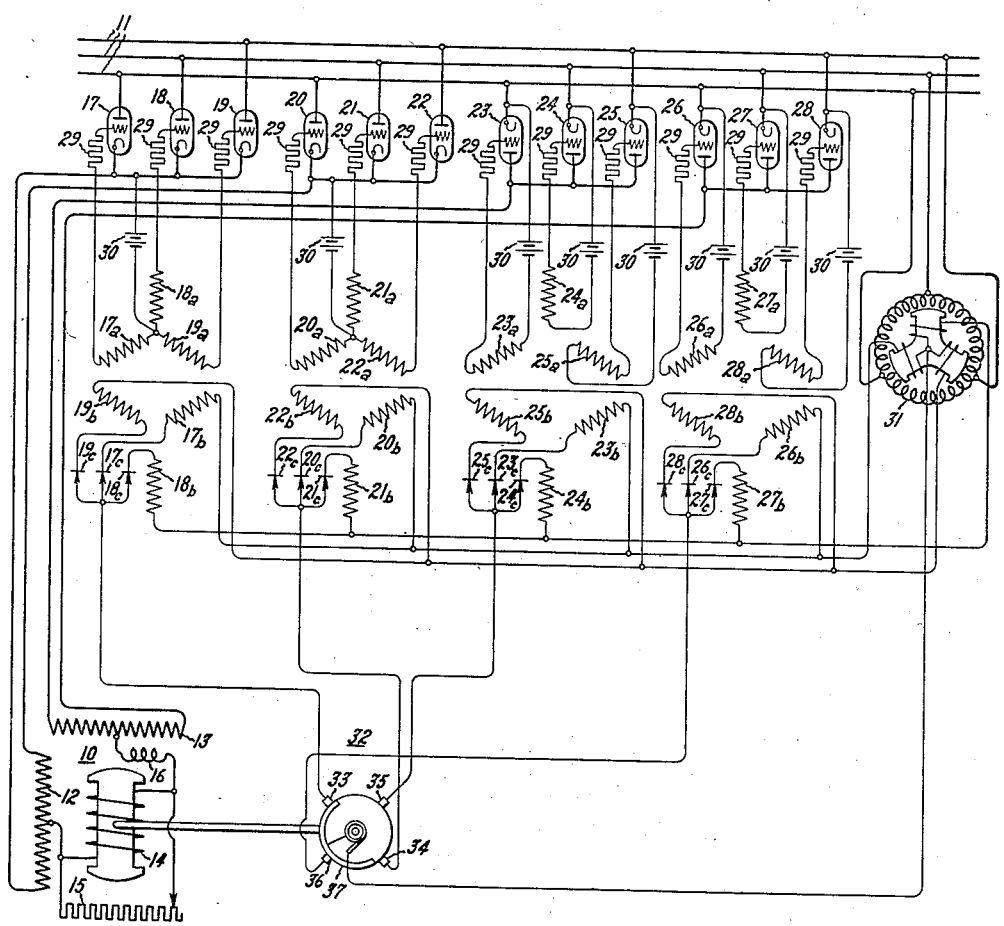

Aug. 28, 1934.  E. L. PHILLIPI  1,971,833
ELECTRIC VALVE CONVERTING SYSTEM AND EXCITATION APPARATUS THEREFOR
Filed July 1, 1933

Inventor:
Earl L. Phillipi,
by *Harry E. Dunham*
His Attorney.

Patented Aug. 28, 1934

1,971,833

UNITED STATES PATENT OFFICE 1,971,833

ELECTRIC VALVE CONVERTING SYSTEM AND EXCITATION APPARATUS THEREFOR

Earl L. Phillipi, Schenectady, N. Y., assignor to General Electric Company, a corporation of New York Application July 1, 1933, Serial No. 678,643

9 Claims. (Cl. 172—120)

My invention relates to improved electric valve converting systems, and more particularly to new and improved apparatus for exciting the control elements of the electric valves of such systems.

In many of the electric valve converting systems of the prior art a plurality of groups of electric valves interconnect the several terminals of the supply circuit with each of the terminals of the load circuit and the groups of electric valves are rendered conductive in a predetermined sequence to supply current to their respective terminals of the load circuit by means of a distributor mechanism driven at a speed corresponding to the frequency at which it is desired to energize the load circuit. It often occurs, however, that the control circuits of the several electric valves of each group are energized from independent sources of electromotive force, such for example, as when the valves of each group interconnect the several phase terminals of a polyphase alternating current supply circuit and their associated control elements are energized with alternating potentials having a corresponding phase displacement. With such an arrangement, it has been necessary to supply a separate distributor disk for each separate source of excitation, as for example, for each separate phase of the supply circuit, while each disk is provided with a separate brush for each of the groups of electric valves, or some equivalent mechanical arrangement. In other words, each electric valve has required a separate brush and segment element of a distributor. Such a circuit arrangement involves an undesirable complexity in the excitation apparatus of the valve converting system, particularly where the load circuit of the valve converting system includes a dynamo-electric machine with limited axial dimensions, as in such a case the distributor mechanism of the system is preferably mounted on the shaft of the motor.

It is an object of my invention, therefore, to provide an improved electric valve converting system and excitation apparatus therefor which will overcome the above mentioned disadvantages of the arrangements of the prior art and which will be simple and reliable in operation.

It is another object of my invention to provide an improved excitation apparatus for an electric valve converting system in which a group of electric valves interconnects the supply circuit with each terminal of the load circuit and in which the control circuits of the several valves of each group are excited from separate sources of periodic potential which will require a single distributor disk for controlling the excitation of the several groups of valves.

In accordance with one embodiment of my invention, the several phase terminals of a polyphase alternating current supply circuit are interconnected with each terminal of a load circuit through a group of electric valves. The control elements or grids of the valves of each group are energized from the supply circuit through a plurality of control transformers connected in star polyphase relation. The electrical neutral of the primary or secondary windings of the control transformers associated with each group of electric valves is open and a unilaterally conductive device is included between the winding and the neutral. Also included in the neutral connection to each group of transformers is a brush and segment element of a single disk distributor preferably mounted on the motor shaft. The actual number of conductive segments with which the disk is provided, is, of course, dependent upon the number of poles of the motor to which it is connected, one segment being provided for each pair of poles. By the term "brush and segment element", as used hereinafter, is meant a single brush and segment per pair of poles, either multiple brushes or multiple segments being employed for more than one pair of poles.

For a better understanding of my invention, together with other and further objects thereof, reference is had to the following description taken in connection with the accompanying drawing and its scope will be pointed out in the appended claims.

Figure 2:
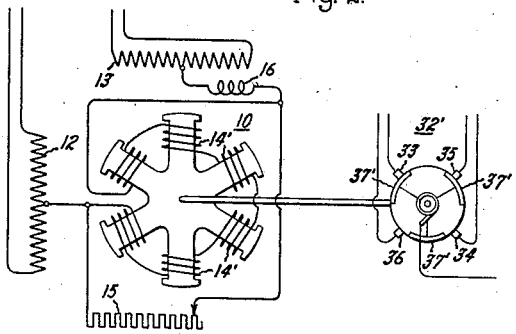

Fig. 1 of the accompanying drawing diagrammatically illustrates an electric valve converting system embodying my invention for transmitting energy from a three-phase alternating current supply circuit to a quarter-phase two-pole alternating current motor, while Fig. 2 shows a modified form of the distributor mechanism for use with a six pole alternating current motor.

Referring now more particularly to the drawing, there is illustrated an arrangement for operating at variable speed a quarter-phase motor 10 from a three-phase alternating current supply circuit 11. The motor 10 may be any of the several types well known in the art, although I have illustrated, by way of example, a motor of the synchronous type comprising the phase windings 12 and 13 and a rotatable field winding 14. The field winding 14 may be connected in series with the armature windings as illustrated, in case it is desired to give the motor series characteristics, or in case shunt characteristics are desired the field winding may be separately excited in any well known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed torque characteristics of the motor, in which case it is preferable also to include a reactor 16 in series with the parallel connected winding 14 and resistor 15. The terminals of the armature phase winding 12 are connected to the several phases of the supply circuit 11 through two groups of similarly connected electric valves 17—18—19 and 20—21—22, respectively. Similarly, the armature phase winding 13 is connected to the supply circuit 11 through two groups of electric valves 23—24—25 and 26—27—28, connected to the circuit 11 with a polarity opposite to that of the electric valves 17—22, inclusive. Each of the electric valves 17—28, inclusive, is provided with an anode, a cathode, and a control element or grid, and may be of any of the several types well known in the art, although I prefer to use valves of the vapor or gaseous electric discharge type.

In order to control the conductivity of the several electric valves, the grid or control element of each of the valves is connected to its respective cathode through a current limiting resistor 29, a negative bias battery 30 and one of the secondary windings 17a—28a of a plurality of grid transformers, the primary windings 17b—28b of which are connected to be energized from the alternating current circuit 11 through a suitable phase shifting means such as a rotary phase shifting transformer 31. It will be noted that the primary and secondary windings of a grid transformer associated with a particular valve are designated by the number of that valve with the subscripts "a" and "b", respectively. The primary windings of the grid transformers associated with the groups of electric valves 17—18—19, 20—21—22, etc., are connected in star and interposed in the connections between each primary winding and the electrical neutral of its group is one of the unilaterally conductive devices 17c—28c.

In order selectively to render conductive the several groups of electric valves 17—18—19, 20—21—22, etc., there is provided a single disk distributor mechanism 32 driven from the motor 10 and provided with four equally spaced brushes 33, 34, 35 and 36, and a single contact segment 37 extending for substantially 180 electrical degrees. The contact segment 37 is connected through a suitable slip ring to the electrical neutral of the secondary winding of the phase shifting transformer 31, while the several brushes 33-36, inclusive, are connected to the electrical neutrals of the groups of primary windings of the grid transformers so that the neutral connection of each of the groups of primary windings 17b—18b—19b, 20b—21b—22b, etc., includes a single brush and segment element of the distributor mechanism 32.

The general principles of operation of the above described apparatus for transmitting energy from the alternating current circuit 11 to the motor 10 will be well understood by those skilled in the art, or will be found explained in detail in the United States Letters Patent to E. F. W. Alexanderson, Serial No. 598,380, filed March 12, 1932, No. 1,937,377, granted November 28, 1933, and assigned to the same assignee as the present application. That patent discloses and broadly claims the above described power circuit as well as the feature of selectively energizing the grids of the several electric valves from a source of alternating potential through a commutating device. In brief, it will be assumed that the motor field member 14 and the distributor mechanism 32 are in substantially the positions illustrated and that the rotary phase shifting transformer 31 is so adjusted that the potentials impressed upon the grids of the several electric valves through their associated transformers are substantially in phase with the anode potentials of the valves.

Under these conditions it will be seen that the electrical neutral connections of the groups of primary windings 17b—18b—19b and 26b—27b—28b are completed through the brushes 33 and 36, respectively, of the distributor mechanism 32, while the electrical neutrals of the other networks of the grid transformers are open circuited so that these grid transformes are deenergized. For the time being, neglecting the effect of the unilaterally conductive devices 17b—28b, inclusive, it will be seen that the primary windings 17b—18b—19b and 26b—27b—28b are energized from the alternating current circuit 11 through the phase shifting transformer 31 and these windings will be effective to impress alternating potentials of appropriate phase relation upon the grids of the valves 17—18—19 and 26—27—28. These two groups of valves 17—18—19 and 26—27—28 comprise a three-phase full wave rectifier circuit of which the unidirectional current circuit comprises the lower half of the motor armature winding 12, the field winding 14, reactor 16, and the right-hand portion of the armature winding 13.

The resultant motor field created by current flowing in the armature windings 12 and 13 will be in such a direction as to exert a torque upon the motor field 14 and initiate rotation of the motor, which it will be assumed, is in a clockwise direction. When the motor 10 has rotated through approximately 90 electrical degrees, the neutral connection of the transformer windings 26b—27b—28b will be opened at the brush 36, while the neutral connections of the transformer windings 23b—24b—25b will be completed at the brush 35. The result is that the group of valves 26—27—28 become non-conductive, while the electric valves 23—24—25 are rendered conductive to transfer the current from the right-hand portion of the armature winding 13 to the left-hand portion. The armature magnetomotive force of the motor 10 is thus advanced 90 electrical degrees and a torque is produced on the motor field 14 to rotate it through an additional 90 degrees. In this manner, current is successively commutated between the several terminals of the armature windings 12 and 13 to produce a rotating armature magnetomotive force and rotation of the motor 10. The distributor mechanism 32 serves to complete the neutral connections of the transformer windings associated with only those groups of valves connected to the armature windings of the motor 10 which are in a torque producing position with respect to the motor field 14 at the particular instant.

If the unilaterally conductive devices 17c—28c were omitted and the neutrals of the several groups of transformer windings directly closed, it will be seen that these windings would be continuously energized from the secondary winding of the phase shifting transformer 31, irrespective of the completion of the neutral circuits. As stated above, in the arrangements of the prior art this result has been avoided by providing a plurality of distributor disks, one for each phase of the supply circuit and controlling each transformer primary winding entirely separately. With the unilaterally conductive devices 17c—18c—19c interposed between the windings 17b—18b—19b, respectively, however, the path interconnecting any two of the primary windings of the polyphase network includes two oppositely connected unilaterally conductive devices which are effective to prevent the flow of current in this path. Thus, the current can flow through each of the primary windings only through the unilaterally conductive device and the neutral connection. In this way, by opening the neutral connection of a group of transformer windings, the windings are completely deenergized and are effectively isolated from each other.

As is well understood by those skilled in the art, the average voltage impressed upon the armature windings 12 and 13 may be reduced under starting conditions by retarding the phase of the potentials applied to the grid transformer windings 17b—28b, inclusive, by means of the rotary phase shifting transformer 31, an operation well known in the art. By gradually advancing the phase of the grid potentials by the rotary phase shifting transformer 31 the average voltage impressed upon the motor 10 may be increased to increase the speed of the motor. Additional speed control may be obtained by adjusting the variable resistor 15 connected in parallel with the field winding 14. With the above-described arrangement the motor 10, although having structural characteristics of an alternating current synchronous motor, is given speed-torque characteristics similar to those of a direct current series motor.

In Fig. 2 is shown a modified form of a distributor mechanism 32' suitable for operation from a motor 10 having a six pole field member 14'. In this case the single conductive segment 37 of the distributor mechanism 32 is replaced by three conductive segments 37' of the distributor mechanism 32', each segment extending over 60 mechanical degrees, or 180 electrical degrees, as in the arrangement of Fig. 1.

While I have illustrated distributor devices comprising a plurality of stationary brushes and a single conductive segment per pair of poles of the motor, it will be obvious to those skilled in the art that the contact segment may be the stationary element and the brushes mounted rotatably, or that a single rotatable brush and a plurality of stationary segments, or a single stationary brush and a plurality of rotatable segments may be utilized if desired, all of which are well known mechanical equivalents, as the particular structure illustrated, per se, forms no part of my present invention. In each case, however, it will be observed, that there is a single brush for each group of electric valves, the term "segment element" as here used, and used in the claims hereinafter refers to a single segment, or a plurality of similarly excited segments, as in the arrangement of Fig. 2, or their well known mechanical equivalents.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a grid controlled electric valve converting system for transmitting energy from a supply circuit to a load circuit provided with a plurality of terminals, said system including a plurality of groups of electric valves, each having more than two electrodes, each group interconnecting said supply circuit with a terminal of said load circuit, apparatus for exciting the grids of the valves to render said groups conductive in a predetermined sequence comprising a circuit for exciting the grid of each of said valves, a single distributor having a segment element, said distributor having a brush for each of said groups of valves, a common circuit interconnecting the several grid circuits of each group of valves and one of said brush and segment elements, and means interposed between the grid circuits of each group to prevent the interchange of energy therebetween.

2. In a grid controlled electric valve converting system for transmitting energy from a supply circuit to a load circuit provided with a plurality of terminals, said system including a plurality of groups of electric valves, each group interconnecting said supply circuit with a terminal of said load circuit, apparatus for exciting the grids of the valves to render said groups conductive in a predetermined sequence comprising a circuit for exciting the grid of each of said valves, a single distributor having a segment element, said distributor having a brush for each of said groups of valves, a common circuit interconnecting the several grid circuits of each group of valves and one of said brush and segment elements, and a unilaterally conductive device interposed between each of the grid circuits of a group and said common circuit for isolating said grid circuits.

3. In a grid controlled electric valve converting system for transmitting energy from a polyphase alternating current supply circuit to a load circuit provided with a plurality of terminals, said system including a plurality of groups of electric valves, each having more than two electrodes, each group interconnecting the several phases of said supply circuit with a terminal of said load circuit, apparatus for exciting the grids of the valves to render said groups conductive in a predetermined sequence comprising a circuit for exciting the grid of each of said valves including a source of periodic potential of a phase relation corresponding to that of the supply base to which the corresponding valve is connected, a single distributor having a segment element, said distributor having a brush for each of said groups of valves, a common circuit interconnecting the several grid circuits of each group of valves and one of said brush and segment elements, and means interposed between the grid circuits of each group to prevent interchange of energy therebetween.

4. In a grid controlled electric valve converting system for transmitting energy from a polyphase alternating current supply circuit to a load circuit provided with a plurality of terminals, said system including a plurality of groups of electric valves, each group interconnecting the several phases of said supply circuit with the terminal of said load circuit, apparatus for exciting the grids of the valves to render said groups conductive in a predetermined sequence comprising a grid transformer for exciting the grid of each of said valves and provided with primary and secondary windings, the grid transformers associated with the valves of each group being energized in polyphase relation from said supply circuit, a single distributor having a segment element, said distributor having a brush for each of said groups of valves, a common circuit interconnecting a winding of each of the transformers associated with a group of valves and one of said brush and segment elements, and means interposed between the windings and said common circuit of each group for isolating said windings.

5. In a grid controlled electric valve converting system for transmitting energy from a polyphase alternating current supply circuit to a load circuit provided with a plurality of terminals, said system including a plurality of groups of electric valves, each group interconnecting the several phases of said supply circuit with a terminal of said load circuit, apparatus for exciting the grids of the valves to render said groups conductive in a predetermined sequence comprising a grid transformer for exciting the grid of each of said valves and provided with primary and secondary windings, said primary windings corresponding to the valves of each group being connected in star and connected to be energized from said supply circuit, a unilaterally conductive device interposed between each of said primary windings and its respective neutral, a single distributor having a segment element, said distributor having a brush for each of said groups of valves, each of said brush and segment elements being included in the neutral connection of one of said groups of star connected windings.

6. An electric valve converting system comprising a supply circuit, a load circuit provided with a plurality of phase terminals, a plurality of groups of three electrode electric valves, each group interconnecting said supply circuit with a terminal of said load circuit, a grid circuit for each of said valves, a single distributor having a segment element, said distributor having a brush for each of said groups of valves, a common circuit interconnecting the several grid circuits of each group of valves and one of said brush and segment elements, and means interposed between the grid circuits of each group to prevent the interchange of energy therebetween.

7. An electric valve converting system comprising an alternating current supply circuit, a polyphase alternating current load circuit including a polyphase alternating current motor, a plurality of groups of electric valves, each group interconnecting said supply circuit with a phase terminal of said load circuit, a grid circuit for each of said valves, a single distributor driven by said motor and having a segment element, said distributor having a brush for each of said groups of valves, a common circuit interconnecting the several grid circuits of each group of valves and one of said brush and segment elements, and means interposed between the grid circuits of each group to prevent the interchange of energy therebetween.

8. An electric valve converting system comprising a polyphase alternating current supply circuit, a polyphase alternating current motor, a plurality of groups of electric valves, each group interconnecting the several phases of said supply circuit and a phase terminal of said motor, a grid transformer for exciting the grid of each of said valves and provided with primary and secondary windings, said primary windings corresponding to the valves of each group being connected in star and connected to be energized from said supply circuit, a unilaterally conductive device interposed between each of said primary windings and its respective neutral, a single distributor driven by said motor and having a segment element, said distributor having a brush for each of said groups of valves, each of said brush and segment elements being included in the neutral connection of one of said groups of star connected windings.

9. An electric valve converting system comprising a polyphase alternating current supply circuit, a load circuit provided with a plurality of terminals, a plurality of groups of three electrode electric valves, each group interconnecting the several phases of said supply circuit with a terminal of said load circuit, apparatus for exciting the control elements of each of the valves to render said groups conductive in a predetermined sequence comprising a polyphase control circuit including a source of polyphase potential connected to the several control elements of each group of valves, a distributor provided with a single disc and a plurality of brushes, each of said polyphase control circuits including a brush circuit of said distributor, and means for preventing the interchange of energy between the phases of each polyphase control circuit.

EARL L. PHILLIPI.

---

CERTIFICATE OF CORRECTION.

Patent No. 1,971,833.　　　　　　　　　　　　　　　August 28, 1934.

EARL L. PHILLIPI.

It is hereby certified that error appears in the printed specification of the above numbered patent requiring correction as follows: Page 3, line 132, claim 3, for "base" read phase; and that the said Letters Patent should be read with this correction therein that the same may conform to the record of the case in the Patent Office.

Signed and sealed this 25th day of September, A. D. 1934.

Leslie Frazer (Seal)　　　　　　　　　　　　　　　　　　　　　Acting Commissioner of Patents.